Patented June 28, 1949

2,474,740

UNITED STATES PATENT OFFICE 2,474,740

PROCESS OF PREPARING PARTIAL ESTERS OF GLYCERINE AND FATTY ACIDS

Martin Hill Ittner, deceased, late of Township of Wall, Monmouth County, N. J., by Hildegard H. Ittner, executrix, West Hartford, Conn., assignor to Colgate-Palmolive-Peet Company, Jersey City, N. J., a corporation of Delaware No Drawing. Application April 12, 1946, Serial No. 661,891

4 Claims. (Cl. 260—410.7)

The present invention relates to the preparation of partial esters of fatty acids with glycerine and more particularly to a continuous countercurrent process of preparing monoglycerides from fats or oils and glycerine.

It is known that glycerine will react with triglycerides such as fats and oils at temperatures above about 200° C. to form partial esters, largely diglycerides. The rate of reaction is so low, however, that the process is not attractive for commercial use. As a result, moreover, of the long time that fatty material is required to be held at elevated temperature there is considerable darkening which it is desirable to avoid. Various catalysts have been proposed for use in this reaction for the purpose of speeding up the rate of reaction and making it possible to operate at lower temperatures. These proposals have not been fully satisfactory in practice, the products obtained have been contaminated with the catalyst or a reaction product thereof with the fatty glycerides which has had to be removed, and the process has been carried out batchwise.

An object of this invention is to provide an improved process for producing monoglycerides by the reaction of glycerine with fats and oils. A further object is to provide a continuous countercurrent process for this reaction.

In carrying out the invention a reaction tower similar to that disclosed in Ittner U. S. Reissue Patent No. 22,006 is used. Preheated fat is introduced into the tower adjacent to the bottom but some distance above a glycerine outlet and glycerine containing a minor proportion of water is introduced adjacent to the top but some distance below an outlet for the ester product. The materials flow in countercurrent relation through the tower in intimate contact with each other at elevated temperature, preferably within the range of 200° to 350° C., and under sufficient pressure to maintain water in liquid phase.

The presence of water is an essential feature of this invention. In the absence of water, glycerine is miscible with monoglycerides at the temperatures which are advantageously used for this process but when glycerine containing even a few per cent of water is used two phases are formed which make the countercurrent process possible. The denser of these two phases is a glycerine phase containing most of the water and a small amount of fatty material. The other phase is a fatty phase which contains varying amounts of glycerine in solution, depending upon the temperature.

An advantageous method of operating the tower to carry out the present invention is to maintain a layer of the glycerine phase in the bottom of the tower with a layer of the fatty phase thereabove into which the glycerine solution is dispersed in fine droplets which fall down through the fatty phase in intimate contact therewith. The fatty material may be introduced into the tower at, above or below the interface between the glycerine and fatty layers. The feed of glycerine and fats to the tower and the removal of glycerine and esters therefrom may be continuous, alternate or intermittent, the feed and withdrawal being so controlled that the interface remains at approximately the same level.

Under these operating conditions it has been found that the reaction between glycerine and fats proceeds to equilibrium in the presence of water at approximately the same rate as in the presence of catalysts such as sodium hydroxide, soap, and the like. The water is advantageous, therefore, not only to cause the formation of two phases but also to cause a rapid increase in the rate of reaction.

Among the various fatty triglycerides that may be used as starting materials in the present invention, are fats and oils of animal and vegetable sources, such as tallow, fish oils, olive oil, palm oil, coconut oil, palm kernel oil, grease, etc., and modified oils, such as hydrogenated tallow, bodied linseed oil, etc. Fatty diglycerides may also be used. These fatty materials, which may be defined as fatty glycerides having at least two esterified hydroxy groups, may be introduced singly or as blends of two or more materials. Satisfactory results are obtained when glycerine is introduced at a rate of about 1.5 to 2.5 parts by weight to each part of fatty material.

The reaction is carried out at a temperature within the range of about 200° to 350° C. The temperature range is not critical in the sense that the reaction will proceed both below 200° and above 350° C., but below 200° C. the reaction is slower than desired in most commercial applications of the process, and above 350° C. the reaction product is darkened more than desired for most applications of the product. A temperature in the vicinity of 250° C., e. g., within the range of about 225° to 275° C., is preferable for most materials.

The pressure must be maintained sufficiently high throughout the reaction to maintain water in liquid phase. The pressure must be at least equal to the vapor pressure of water at the temperature of the reaction mixture and it may be considerably higher.

The time of reaction depends largely upon the temperature, varying roughly inversely therewith, i. e., at higher temperatures the reaction time is shorter than at lower temperatures. At temperatures around 240° C. a reaction time of about two hours is sufficient.

The amount of water in the reaction system may vary over a considerable range. Ordinarily it is preferred to use about 5% to 10% by weight of water based upon the amount of polyhydric alcohol employed, and in most cases the water is preferably added in solution in the alcohol. The percentage of water in the system has a direct influence on the composition of the reaction product. If the water concentration is high enough, the main product in the reaction mixture is fatty acids, a condition which generally is not desirable. In the case of coconut oil, for example, if 95% glycerine (5% water) is used, the reaction product usually contains about 5% to 7% free fatty acids. If 90% glycerine (10% water) is used, the reaction product usually contains about 10 to 13% free fatty acids. If 50% glycerine (50% water) is used, the free fatty acids amount to approximately 40% of the reaction product. Ordinarily it is preferred to use water under about 15% by weight of the alcohol.

The following examples are given for the purpose of illustrating the process and advantages of the present invention.

*Example I*

Coconut oil and aqueous glycerine are introduced into the lower and upper ends respectively of a countercurrent tower at such rate that the time of passage is approximately two hours. The feed rates are respectively 80 parts by weight of glycerine solution to 34 parts of coconut oil per unit time. The glycerine contains about 10% by weight of water. The glycerine solution is preheated to about 160° C. and the coconut oil to about 220° C. before being introduced into the column where the average operating temperature is maintained at about 240° C. by the use of external heaters. Glycerine solution is withdrawn from the bottom of the column at a rate of about 76.9 parts per unit time and the reaction product is withdrawn from the top of the tower at a rate of about 83.1 parts per unit time. The interface between the glycerine and oil phases was maintained about five feet from the bottom of the column. The pressure was maintained at about 670 pounds per square inch gauge. The product withdrawn from the column is cooled, permitted to separate into layers, and the ester layer is water washed to remove uncombined glycerine. The product is found to contain about 12.7% free fatty acids and about 56% monoglycerides.

*Example II*

Using the same equipment as in Example I, the process is operated in the same manner except that 95% glycerine (5% water) is used and the rates of feed are 37 parts of coconut oil to 88 parts of glycerine per unit time. The water washed product is found to contain about 6.9% free fatty acid and about 56% monoglycerides.

The monoglyceride product obtained by the process of the present invention may be treated in any desired way to improve the color, to remove free fatty acids, etc. The product obtained by the present process has good color, has a satisfactory odor and is free of contamination with catalysts, etc. The monoester may be used in any of the processes or products where similar esters made by other processes are used.

Although the present invention has been described and illustrated with reference to particular embodiments and examples various modification of the invention can be made and equivalents can be substituted without departing from the principle and scope of the invention as described hereinabove and defined in the appended claims.

What is claimed is:

1. The process of preparing partial esters of glycerine and fatty acids having a larger number of free hydroxy groups than the starting glycerides which comprises feeding the fatty glycerides having at least two esterified hydroxy groups and glycerine containing a minor proportion of water into the lower and upper ends, respectively of a vertical reaction zone, passing the materials in countercurrent flow through the reaction zone at a temperature within the range of about 200° to 350° C. under sufficient pressure to keep water in liquid phase, and withdrawing the reaction product and excess glycerine from the top and bottom of reaction zone, respectively.

2. The process of preparing partial esters of glycerine and fatty acids which comprises continuously feeding fatty triglycerides and glycerine containing about 5 to 15% water into the lower and upper ends, respectively, of a vertical reaction zone, passing the materials through said zone at a temperature within the range of about 200° to 350° C. under sufficient pressure to keep water in liquid phase, continuously removing the fatty reaction products from the upper end of the reaction zone and excess glycerine from the lower end thereof, and recovering the ester product substantially free from uncombined glycerine.

3. The process of preparing a fatty reaction product high in monoglyceride content which comprises contacting fatty triglycerides with glycerine containing a minor proportion of water by countercurrent flow in a vertical reaction zone at about 200° to 300° C. and under sufficient pressure to maintain water in liquid phase, the fatty triglycerides being introduced in the lower part of said zone, the glycerine being introduced in the upper part of said zone, the excess glycerine being removed below the level of introduction of the fatty triglycerides and the fatty reaction product being removed above the level of glycerine introduction.

4. The process which comprises continuously introducing aqueous glycerine containing up to about 15% of water into the upper part of a vertical column, continuously introducing a fatty triglyceride into the lower part of said column, continuously removing a monoglyceride product from the top of the column, continuously removing aqueous glycerine from the bottom of the column, maintaining the temperature during the major part of the countercurrent flow within the range of about 200° to about 300° C. and maintaining the pressure at least equal to the pressure of water vapor at the temperature in the reaction zone.

HILDEGARD H. ITTNER,
*Executrix of the Last Will and Testament of Martin Hill Ittner, Deceased.*

REFERENCES CITED

The following references are of record in the file of this patent:

UNITED STATES PATENTS

| Number | Name | Date |
|---|---|---|
| 2,221,799 | Ittner | Nov. 19, 1940 |